(12) United States Patent
Akimoto et al.

(10) Patent No.: US 8,832,928 B2
(45) Date of Patent: *Sep. 16, 2014

(54) METHOD OF MANUFACTURING COIL ASSEMBLY FOR ELECTRIC ROTATING MACHINE

(75) Inventors: Akito Akimoto, Kariya (JP); Tetsuya Gorohata, Anjo (JP); Youichi Kamakura, Anjo (JP)

(73) Assignee: Denso Corporation, Kariya (JP)

( * ) Notice: Subject to any disclaimer, the term of this patent is extended or adjusted under 35 U.S.C. 154(b) by 1058 days.

This patent is subject to a terminal disclaimer.

(21) Appl. No.: 12/743,608

(22) PCT Filed: Nov. 18, 2008

(86) PCT No.: PCT/JP2008/070908
§ 371 (c)(1),
(2), (4) Date: Aug. 12, 2010

(87) PCT Pub. No.: WO2009/066649
PCT Pub. Date: May 28, 2009

(65) Prior Publication Data
US 2011/0041318 A1    Feb. 24, 2011

(30) Foreign Application Priority Data
Nov. 20, 2007 (JP) ................................. 2007-300858
Apr. 18, 2008 (JP) ................................. 2008-109558

(51) Int. Cl.
*H02K 15/04* (2006.01)
(52) U.S. Cl.
CPC .................. *H02K 15/0478* (2013.01)
USPC ............................................ 29/605; 29/596
(58) Field of Classification Search
CPC ................................................. H02K 15/0478
USPC .............................................. 29/596, 598, 605
See application file for complete search history.

(56) References Cited

U.S. PATENT DOCUMENTS 5,936,326 A    8/1999 Umeda et al.
6,376,961 B2   4/2002 Murakami et al.
(Continued)

FOREIGN PATENT DOCUMENTS

JP    11-285216    10/1999
(Continued)

OTHER PUBLICATIONS

International Search Report for PCT/JP2008/070908, mailed Feb. 3, 2009.
English translation of International Preliminary Report on Patentability, dated Jun. 17, 2010, issued in corresponding International Application No. PCT/JP2008/070908.

*Primary Examiner* — Livius R Cazan
(74) *Attorney, Agent, or Firm* — Nixon & Vanderhye P.C.

(57) ABSTRACT

At one ends of a pair of coil wires 30, a pair of turn portions 42 are crossed. Further, the other ends of the coil wires 30 are held such that an angle θ between the axes of the coil wires 30 falls in a predetermined range (e.g., greater than or equal to 10° and less than or equal to 90°). Then, the coil wires 30 are rotated respectively about their axes in the same direction, so that corresponding pairs of turn portions 42 of the coil wires 30 are sequentially crossed from the one ends to the other ends, thereby interlacing the coil wires 30.

19 Claims, 15 Drawing Sheets

FIRST MODIFICATION

(56) References Cited

U.S. PATENT DOCUMENTS

| | | | |
|---|---|---|---|
| 6,710,498 B1 * | 3/2004 | Lee et al. | 310/211 |
| 6,951,054 B2 | 10/2005 | Hirota et al. | |
| 7,891,082 B2 * | 2/2011 | Akimoto | 29/606 |
| 2006/0005376 A1 | 1/2006 | Hirota et al. | |
| 2009/0320275 A1 * | 12/2009 | Dobashi et al. | 29/596 |

FOREIGN PATENT DOCUMENTS

| JP | 2002-27693 | 1/2002 |
|---|---|---|
| JP | 2002-176752 | 6/2002 |
| JP | 2003-18778 | 1/2003 |
| JP | 3894483 | 12/2006 |
| JP | 2007-151295 | 6/2007 |

* cited by examiner

Substantially 3m

FIG.9
Nos. of coil wires
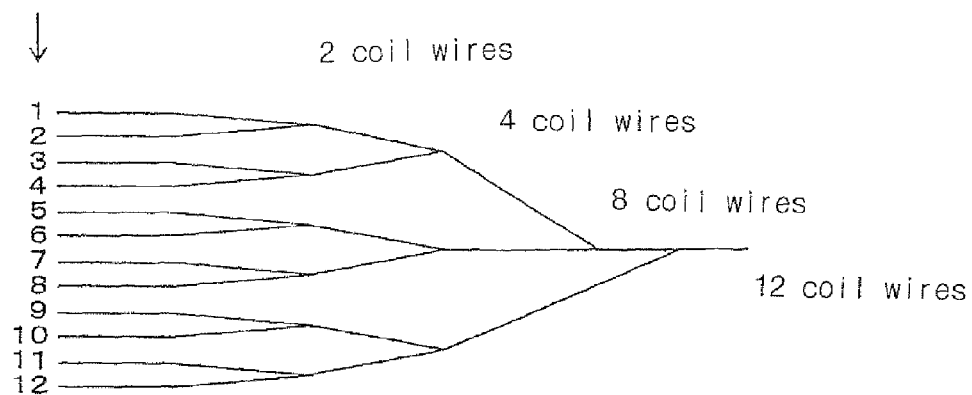
FIG.10   FIRST MODIFICATION
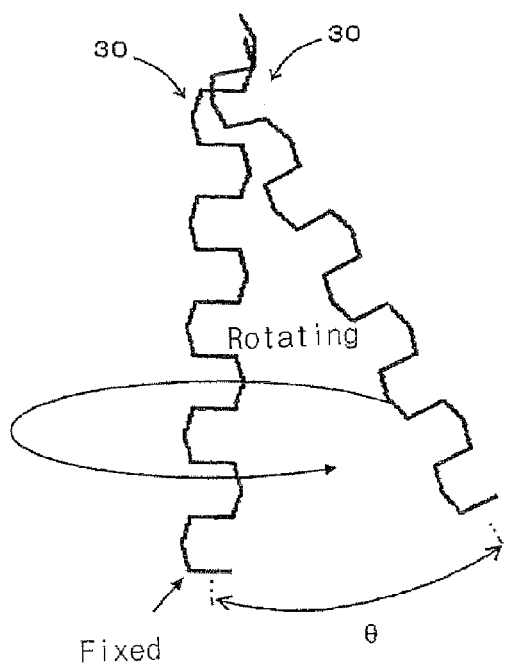

FIG.11    SECOND MODIFICATION
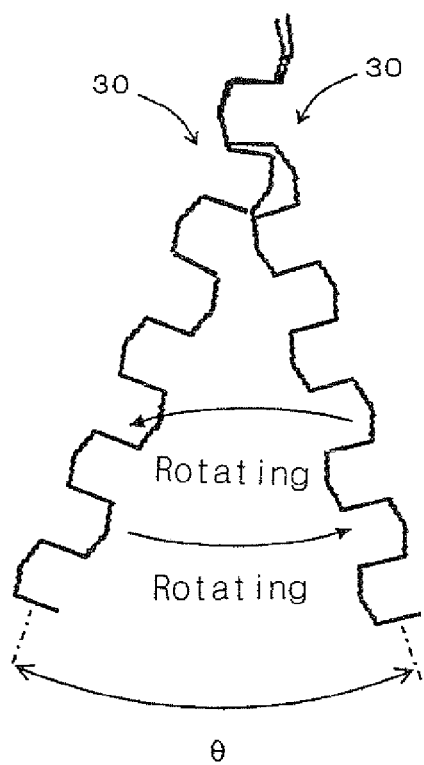

METHOD OF MANUFACTURING COIL ASSEMBLY FOR ELECTRIC ROTATING MACHINE

This application is the U.S. national phase of International Application No. PCT/JP2008/070908 filed 18 Nov. 2008, which designated the U.S. and claims priority to Japan Application No. 2007-300858 filed 20 Nov. 2007; and Japan Application No. 2008-109558 filed 18 Apr. 2008, the entire contents of each of which are hereby incorporated by reference.

TECHNICAL FIELD

The present invention relates to methods of manufacturing coil assemblies for electric rotating machines.

BACKGROUND ART

Conventionally, various methods have been proposed for manufacturing coil assemblies for electric rotating machines. For example, in Patent Document 1, there is disclosed a method of simultaneously winding a plurality of coil wires using a pair of plate-like winding cores opposed to each other. Moreover, in Patent Document 2, there is disclosed a method of interlacing coil wires that are shaped by a winding process into a triangular wave shape. According to the method, one coil wire is progressively interlaced with another coil wire by a half turn at a time by repeating the steps of: rotating the one coil wire about its axis by 90° and advancing the one coil wire toward the another coil wire so as to increase the overlap between the two coil wires by a half turn; and rotating the one coil wire further about its axis by 90°.

Patent Document 1: Japanese Unexamined Patent Application Publication No. 2002-176752

Patent Document 2: Japanese Unexamined Patent Application Publication No. 2004-104841

DISCLOSURE OF THE INVENTION

Problems to be Solved by the Invention

However, in Patent Document 2, the interlacing process is performed with the triangular wave-shaped coil wires. Therefore, to obtain coil members having a final shape (see FIG. 2 of Patent Document 2), it is necessary to perform, after the interlacing process, a displacing process in which straight portions of the coil wires are displaced and thereby deformed using a plurality of moving members (see FIG. 34 of Patent Document 2). Consequently, problems are caused which include the problem of resulting in an increase in man-hour and the problem of damaging, during the displacing process, insulating coats that cover the surfaces of the coil wires.

The present invention has been made in view of the above-mentioned problems. It is, therefore, an object of the present invention to provide a method of manufacturing a coil assembly for an electric rotating machine, with which coil wires can be easily and reliably interlaced and with which it is unnecessary to perform a process of deforming the coil wires after the interlacing process.

Means for Solving Problems

Hereinafter, means suitable for solving the above-described problems will be described appending functions and effects where needed.

1. A method of manufacturing a coil assembly for an electric rotating machine by interlacing a plurality of coil wires each having a plurality of turn portions formed therein, characterized by comprising:

a placing step for placing a first coil wire and a second coil wire at predetermined positions with respect to each other;

a first rotating step for rotating, while keeping engagement between a first turn portion of the first coil wire and a first turn portion of the second coil wire, at least one of the first and second coil wires to engage a second turn portion of the first coil wire with a second turn portion of the second coil wire; and a second rotating step for rotating, while keeping engagement between the second turn portion of the first coil wire and the second turn portion of the second coil wire, at least one of the first and second coil wires to engage a third turn portion of the first coil wire with a third turn portion of the second coil wire.

According to Means 1, it is possible to interlace the first and second coil wires by performing the placing step to place the first and second coil wires at the predetermined positions with respect to each other and then sequentially performing the first and second rotating steps. Specifically, in the first rotating step, at least one of the first and second coil wires is rotated, while keeping engagement between the first turn portions of the first and second coil wires, to engage the second turn portion of the first coil wire with the second turn portion of the second coil wire. Consequently, the interlacing of the pair of the first turn portions and the pair of the second turn portions of the first and second coil wires is implemented.

In the subsequent second rotating step, at least one of the first and second coil wires is rotated, while keeping engagement between the second turn portions of the first and second coil wires, to engage the third turn portion of the first coil wire with the third turn portion of the second coil wire. Consequently, the interlacing of the pair of the third turn portions of the first and second coil wires is further implemented. As a result, by continuously performing the first and second rotating steps, corresponding pairs of the turn portions of the first and second coil wires are sequentially interlaced one by one into engagement.

In addition, by identically repeating the first and second rotating steps for the fourth turn portions (regarded as second turn portions at the end of the second rotating step) and subsequent turn portions of the first and second coil wires, it is possible to perform the interlacing of the first and second coil wires over the entire length thereof.

Accordingly, in accordance with Means 1, it is possible to easily and reliably perform the interlacing of the coil wires each having the plurality of turn portions formed therein. Moreover, it is unnecessary to perform a step of deforming the coil wires after interlacing them; it is therefore possible to prevent an increase in man-hour and occurrence of damage to insulating coats that cover the surfaces of the coil wires.

In addition, the coil assembly manufactured by the method according to Means 1 is to be used in, for example, an electric rotating machine that includes a rotor, which has formed therein a plurality of magnetic poles alternately different in polarity from each other in the circumferential direction, and a stator facing the rotor from the radially inside or radially outside of the rotor; the coil assembly makes up a multi-phase stator coil that has a substantially rectangular cross section and is arranged in a plurality of slots of a stator core. Moreover, each of the coil wires includes, for example, a plurality of in-slot portions received in circumferentially different ones of the slots and the turn portions located outside of the slots to connect the in-slot portions; the protruding spots of the turn portions protruding from the slots are shaped into a crank oriented to the slots across which the coil wire is extended. Furthermore, each of the turn portions has a substantially center portion thereof shaped into a crank without twist; the substantially center portion is shifted in position by the crank shape by an amount substantially equal to the width of the coil wires. Further, each of the coil wires may be formed to continuously extend over the entire circumference of the stator core.

2. The method of manufacturing the coil assembly for the electric rotating machine according to Means 1, further characterized by rotating the pair of the coil wires respectively about their axes in the same direction, with one pair of the turn portions crossed at one ends of the coil wires and with the other ends of the coil wires being held such that an angle between the axes of the coil wires falls within a predetermined range, thereby sequentially crossing pairs of the turn portions of the coil wires.

According to Means 2, at one ends of the coil wires, one pair of the turn portions are crossed. Further, the other ends of the coil wires are held such that the angle between the axes of the coil wires falls within the predetermined range. Then, the coil wires are rotated respectively about their axes in the same direction, so that corresponding pairs of the turn portions of the coil wires are sequentially crossed from the one ends to the other ends, thereby interlacing the coil wires. Accordingly, by rotating each of the coil wires about its axis, it is possible to interlace the coil wires without causing interference between the turn portions of the coil wires. Therefore, compared to both a method of making one of the coil wires revolve around the other and a method of making both the coil wires revolve around each other, it is possible to reduce the angle between the axes of the coil wires, thereby suppressing deformation of the coil wires occurring during the interlacing thereof. Moreover, compared to the methods of making either or both of the coil wires revolve, it is possible to use a smaller device to rotate each of the coil wires about its axis. Consequently, it is possible to reduce both the size and cost of an apparatus for manufacturing the coil assembly. Furthermore, since the rotational movement of the coil wires is limited to a smaller range, it is possible to rotate the coil wires at a higher speed. Consequently, it is possible to easily realize a high-speed interlacing of the coil wires.

3. The method of manufacturing the coil assembly for the electric rotating machine according to Means 1 or 2, further characterized in that the angle between the axes of the coil wires is set to be greater than or equal to 10° and less than or equal to 90°.

According to Means 3, the angle between the axes of the coil wires is set to be not less than 10°. Consequently, it is possible to interlace the coil wires without causing interference between the turn portions of the coil wires. Moreover, the angle between the axes of the coil wires is set to be not greater than 90°. Consequently, it is possible to suppress deformation of the coil wires. It is also possible to realize a high-speed interlacing of the coil wires while reducing both the size and cost of an apparatus for manufacturing the coil assembly.

4. The method of manufacturing the coil assembly for the electric rotating machine according to any one of Means 1 to 3, further characterized by rotating the coil wires respectively about their axes keeping synchronization therebetween.

According to Means 4, the coil wires are rotated respectively about their axes keeping synchronization therebetween. As a result, it is possible to sequentially and smoothly cross the corresponding pairs of the turn portions of the coil wires from the one ends to the other ends of the coil wires.

5. The method of manufacturing the coil assembly for the electric rotating machine according to any one of Means 1 to 4, further characterized by rotating the coil wires with the same phase.

According to Means 5, the coil wires are rotated with the same phase (i.e., with the difference in phase angle therebetween being equal to 0°). Consequently, it is possible to reliably and sequentially cross the corresponding pairs of the turn portions of the coil wires without causing interference between the turn portions.

6. The method of manufacturing the coil assembly for the electric rotating machine according to any one of Means 1 to 4, further characterized by rotating the coil wires with the difference in phase angle therebetween being greater than 0° and less than or equal to 90°.

According to Means 6, the coil wires are rotated with the difference in phase angle therebetween being greater than 0° and not greater than 90°. Consequently, to the extent that no interference between the turn portions of the coil wires occurs, it is possible to reduce the angle between the axes of the coil wires while allowing the corresponding pairs of the turn portions to be reliably and sequentially crossed.

7. The method of manufacturing the coil assembly for the electric rotating machine according to Means 6, further characterized by rotating the coil wires with the difference in phase angle therebetween being equal to 90°.

According to Means 7, the coil wires are rotated with the difference in phase angle therebetween being equal to 90°. Consequently, it is possible to minimize the angle between the axes of the coil wires.

8. The method of manufacturing the coil assembly for the electric rotating machine according to any one of Means 1 to 7, further characterized in that: in interlaced sections of the pair of the coil wires, one of the coil wires crosses the other coil wire from a first face side to a second face side of the other coil wire at engaging positions between pairs of the odd-numbered turn portions, and from the second face side to the first face side at engaging positions between pairs of the even-numbered turn portions.

According to Means 8, the pair of the coil wires are interlaced by sequentially crossing corresponding pairs of the turn portions from the one ends to the other ends of the coil wires. Therefore, for those sections of the coil wires which have been interlaced, one of the coil wires crosses the other from the first face side to the second face side of the other coil wire at the engaging positions between pairs of the odd-numbered turn portions, and from the second face side to the first face side at the engaging positions between pairs of the even-numbered turn portions.

9. The method of manufacturing the coil assembly for the electric rotating machine according to any one of Means 1 to 8, further characterized in that: there are provided a plurality of pairs of the coil wires; in interlaced sections of the pairs of the coil wires, one pair of the turn portions of each of the pairs of the coil wires is made to cross that of another of the pairs; with the other ends of the coil wires of the pairs being held such that angles between the axes of the interlaced sections of the pairs of the coil wires fall in a predetermined range, the coil wires of the pairs are rotated respectively about their axes in the same direction, thereby sequentially crossing corresponding turn portions of the coil wires of the pairs.

According to Means 9, there are provided a plurality of pairs of the coil wires. In those sections of the pairs of the coil wires which have been interlaced, one pair of the turn portions of each of the pairs of the coil wires is made to cross that of another of the pairs. Further, the other ends of the coil wires of the pairs are held such that the angles between the axes of the interlaced sections of the pairs of the coil wires fall in the predetermined range. Then, the coil wires of the pairs are rotated respectively about their axes in the same direction, thereby sequentially crossing the corresponding turn portions of the coil wires of the pairs from the one ends to the other ends of the coil wires. Consequently, the pairs of the coil wires can be continuously interlaced.

10. The method of manufacturing the coil assembly for the electric rotating machine according to Means 1, further characterized in that: in the first rotating step, the first and second coil wires are relatively rotated so as to make the second turn portion of the second coil wire rotate around the first coil wire; and in the second rotating step, the first and second coil wires are relatively rotated so as to make the third turn portion of the second coil wire rotate around the first coil wire.

According to Means 10, in the first rotating step, the first and second coil wires are relatively rotated (revolved) so as to make the second turn portion of the second coil wire rotate around the first coil wire. Consequently, after the second turn portion of the second coil wire is rotated by one turn over the second turn portion of the first coil wire, the second turn portions of the first and second coil wires engage each other, thereby being interlaced. Further, in the second rotating step, the first and second coil wires are relatively rotated (revolved) so as to make the third turn portion of the second coil wire rotate around the first coil wire. Consequently, after the third turn portion of the second coil wire is rotated by one turn over the third turn portion of the first coil wire, the third turn portions of the first and second coil wires engage each other, thereby being interlaced. Therefore, according to Means 9, it is possible to easily and reliably perform the interlacing of the coil wires each having the plurality of turn portions, without causing interference between the turn portions of the coil wires.

11. The method of manufacturing the coil assembly for the electric rotating machine according to Means 1 or 10, further characterized in that: in the placing step, the first coil wire and the second coil wire are placed to face each other with the same phase; and in the first and second rotating steps, the first and second coil wires are rotated keeping the same phase.

According to Means 11, in the first and second rotating steps, the coil wires are rotated keeping the same phase (i.e., keeping the difference in phase angle therebetween at 0°). Consequently, it is possible to further reliably and sequentially cross the corresponding pairs of the turn portions of the coil wires without causing interference between the turn portions.

12. The method of manufacturing the coil assembly for the electric rotating machine according to Means 1 or 10, further characterized in that: in the placing step, the first coil wire and the second coil wire are so placed that the difference in phase angle therebetween is equal to 90°; and in the first and second rotating steps, the first and second coil wires are rotated keeping the difference in phase angle at 90°.

According to Means 12, in the first and second rotating steps, the first and second coil wires are rotated keeping the difference in phase angle at 90°. Consequently, it is possible to minimally set the angle between the axes of the coil wires.

13. The method of manufacturing the coil assembly for the electric rotating machine according to any one of Means 1 and 10-12, further characterized in that: in the first and second rotating steps, only the second coil wire is rotated around the first coil wire with the first coil wiring being fixed.

According to Means 13, only the second coil wire is rotated around the first coil wire with the first coil wiring being fixed. Therefore, it is possible to easily control rotational movement of the second coil wire. Consequently, it is possible to more reliably and steadily interlace the first and second coil wires. Moreover, it is also possible to simplify the structure of an interlacing apparatus for interlacing the first and second coil wires, thereby reducing the manufacturing cost.

14. The method of manufacturing the coil assembly for the electric rotating machine according to any one of Means 1 and 10-12, further characterized in that: in the first and second rotating steps, the first and second coil wires are alternately moved.

According to Means 14, the first and second coil wires are alternately moved. Consequently, it is possible to suppress deformation of the first and second coil wires occurring during the interlacing thereof; it is also possible to speed up the interlacing of the first and second coil wires.

15. The method of manufacturing the coil assembly for the electric rotating machine according to any one of Means 1 and 10-14, further characterized in that: after completion of the second rotating step, the first and second rotating steps are identically repeated to interlace corresponding pairs of the fourth and subsequent turn portions of the coil wires.

According to Means 15, it is possible to interlace the first and second coil wires over the entire length thereof by identically repeating the first and second rotating steps.

16. The method of manufacturing the coil assembly for the electric rotating machine according to any one of Means 1 and 10-15, further characterized in that: in interlaced sections of the first and second coil wires, the first coil wire crosses the second coil wire from a first face side to a second face side of the second coil wire at engaging positions between pairs of the odd-numbered turn portions, and from the second face side to the first face side at engaging positions between pairs of the even-numbered turn portions.

According to Means 16, the first and second coil wires are interlaced by sequentially engaging corresponding pairs of the turn portions from the one ends to the other ends of the first and second coil wires. Therefore, for those sections of the first and second coil wires which have been interlaced, the first coil wire crosses the second coil wire from the first face side to the second face side of the second coil wire at the engaging positions between pairs of the odd-numbered turn portions, and from the second face side to the first face side at the engaging positions between pairs of the even-numbered turn portions.

17. The method of manufacturing the coil assembly for the electric rotating machine according to any one of Means 1 and 10-16, further characterized by comprising: the placing step in which a plurality pairs of the first and second coil wires are placed; a third rotating step in which keeping engagement between the first turn portions of one of the pairs of the first and second coil wires and those of another of the pairs in interlaced sections of the pairs of the first and second coil wires, at least one of the one pair and the another pair of the first and second coil wires is rotated to engage the second turn portions of the one pair with the second turn portions of the another pair; and a fourth rotating step in which keeping engagement between the second turn portions of the one pair and the another pair of the first and second coil wires, at least one of the one pair and the another pair of the first and second coil wires is rotated to engage the third turn portions of the one pair with the third turn portions of the another pair.

According to Means 17, the plurality of pairs of the first and second coils are placed. Then, in those sections of the pairs of the first and second coils which have been interlaced, the third and fourth rotating steps are performed, thereby sequentially engaging the first, second, and third turn portions of the one pair with those of the another pair of the first and second coil wires. Consequently, it is possible to continuously interlace the plurality of pairs of the first and second coil wires.

18. The method of manufacturing the coil assembly for the electric rotating machine according to any one of Means 1 to 17, further characterized in that: each of the coil wires includes a plurality of in-slot portions to be received in slots of a stator core and the plurality of turn portions which are to be located outside of the slots to connect the in-slot portions received in circumferentially different ones of the slots.

According to Means 18, it is possible to select and employ the optimal coil wires according to the stator core and the size of the slots.

19. The method of manufacturing the coil assembly for the electric rotating machine according to any one of Means 1 to 18, further characterized in that: in each of the coil wires, the odd-numbered turn portions are alternately formed with the even-numbered turn portions at positions around the axis of the coil wire which are offset in phase from one another by 180°.

According to Means 19, in each of the coil wires, the odd-numbered turn portions are alternately formed with the even-numbered turn portions at positions around the axis of the coil wire which are offset in phase from one another by 180°. Consequently, by performing the first and second rotating steps to make the coil wires rotate (or revolve), it is possible to easily and reliably interlace the corresponding turn portions of the coil wires.

20. The method of manufacturing the coil assembly for the electric rotating machine according to any one of Means 1 to 19, further characterized in that: each of the turn portions of the coil wires is stepped with a plurality of crank portions.

According to Means 20, it is possible to reduce the height of the turn portions in comparison with triangular turn portions which have no crank portions formed therein.

BRIEF DESCRIPTION OF DRAWINGS

FIG. 9 is a schematic view illustrating a procedure for interlacing twelve coil wires.

FIG. 10 is a schematic view illustrating a manufacturing method, according to a first modification, of the coil assembly.

FIG. 11 is a schematic view illustrating a manufacturing method, according to a second modification, of the coil assembly.

FIGS. 15A to 15C are schematic views illustrating a manufacturing method, according to a second embodiment of the present invention, of the coil assembly, wherein FIG. 15A illustrates a placing step and FIGS. 15B and 15C illustrate a first rotating step.

FIGS. 16A to 16C are schematic views illustrating the manufacturing method of the coil assembly according to the second embodiment, wherein FIGS. 16A and 16B illustrate a second rotating step and (C) illustrates a subsequent rotating step.

FIGS. 17A to 17C are schematic views illustrating the manufacturing method of the coil assembly according to the second embodiment, wherein FIGS. 17A to 17C illustrate subsequent rotating steps.

FIGS. 18A to 18C are schematic views illustrating a manufacturing method, according to a third embodiment of the present invention, of the coil assembly, wherein FIG. 18A illustrates a placing step and FIGS. 18B to 18C illustrate a first rotating step.

FIG. 19A to 19C are schematic views illustrating the manufacturing method of the coil assembly according to the third embodiment, wherein FIGS. 19A and 19B illustrate a second rotating step and FIG. 19C illustrates a subsequent rotating step.

DESCRIPTION OF REFERENCE CHARACTERS

12: Stator
14, 15: Slots
20: Coil assembly
30: Coil wire
30A: First coil wire
30B: Second coil wire
A1, B1: First turn portions
A2, B2: Second turn portions
A3, B3: Third turn portions
A4, B4: Fourth turn portions
40: In-slot portion
42: Turn portion
19: Angle between the axes of coil wires

BEST MODES OF THE INVENTION

Figure 1A:
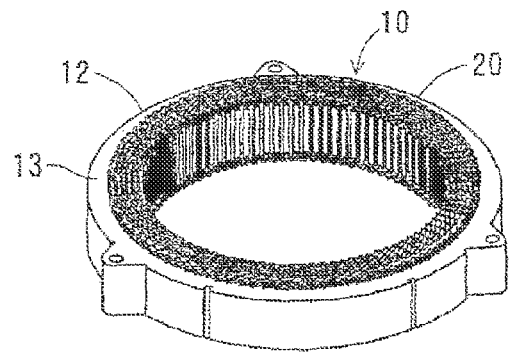
FIG. 1A is a perspective view showing the external appearance of a stator of an electric rotating machine which employs a coil assembly manufactured by using a method according to an embodiment of the present invention.
Figure 1B:
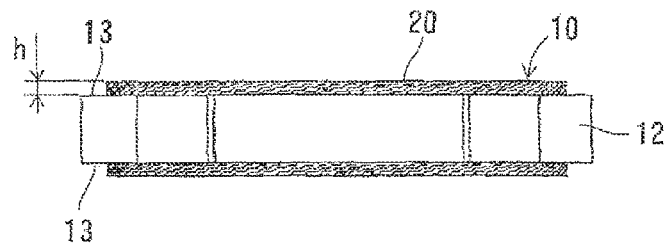
FIG. 1B is a side view of the stator 10.
Figure 2:
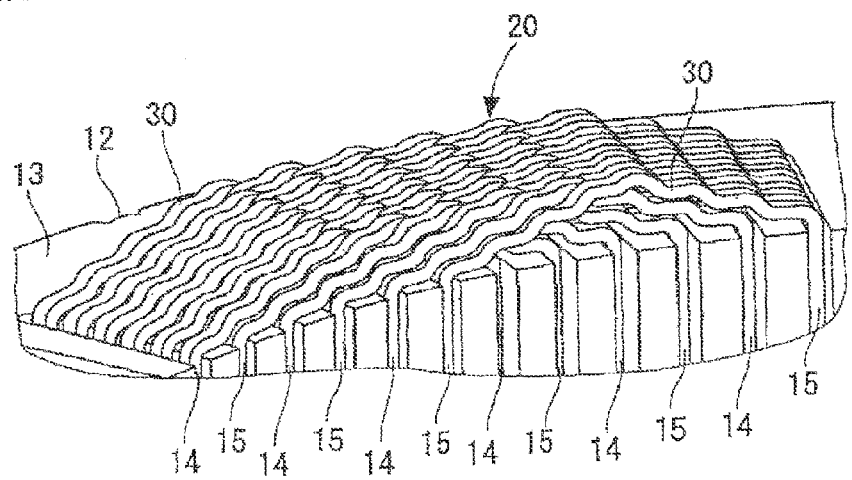
FIG. 2 is a perspective view showing part of the stator through enlargement.

Hereinafter, preferred embodiments, which embody methods of manufacturing a coil assembly for an electric rotating machine according to the present invention, will be described in detail with reference to the drawings. First, the overall configuration of a stator 10 will be described which employs a coil assembly 20 that can be manufactured by the manufacturing methods according to the preferred embodiments of the invention. FIG. 1A is a perspective view showing the external appearance of the stator 10 that includes the coil assembly 20; FIG. 1B is a side view of the stator 10. FIG. 2 is a perspective view showing part of the stator 10 through enlargement.

The stator 10 shown in FIGS. 1A AND 1B is for use in, for example, an electric rotating machine of a motor vehicle which can function both as an electric motor and as an electric generator. The stator 10 has a rotor (not shown) rotatably received radially inside thereof. The rotor has, on a radially outer periphery thereof facing a radially inner periphery of the stator 10, a plurality of magnetic poles that are formed with permanent magnets and alternately different in polarity from each other in the circumferential direction. A stator core 12 of the stator 10 is formed into an annular shape by laminating, in the axial direction, magnetic steel sheets having a predetermined thickness. In the stator core 12, as shown in FIG. 2, there are formed, on the radially inner side and along the circumferential direction of the stator core 12, a plurality of slot pairs each including two circumferentially-adjacent slots 14 and 15 that extend in the axial direction of the stator core 12. The coil assembly 20 is employed as a three-phase stator coil of the stator 10. In each circumferentially-adjacent pair of the slots 14 and 15, there is received one phase of the stator coil. Moreover, in every three circumferentially-adjacent slot pairs, there are received three different phases of the stator coil.

Figure 3:
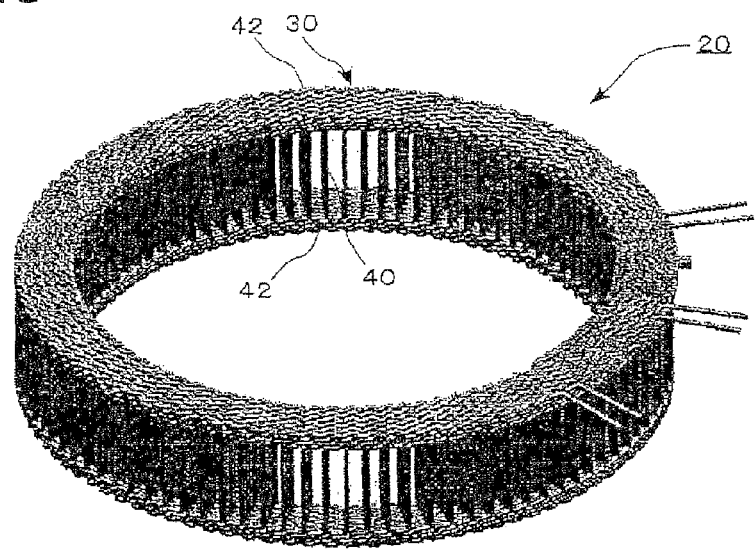
FIG. 3 is a perspective view showing the external appearance of the coil assembly.
Figure 4:
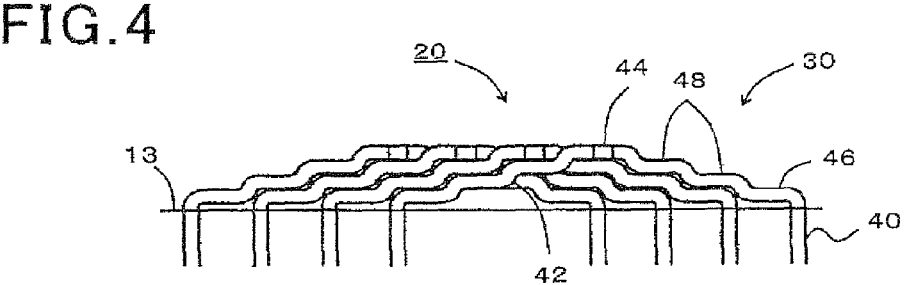
FIG. 4 is a front view showing a coil end portion of the coil assembly.
Figure 5:
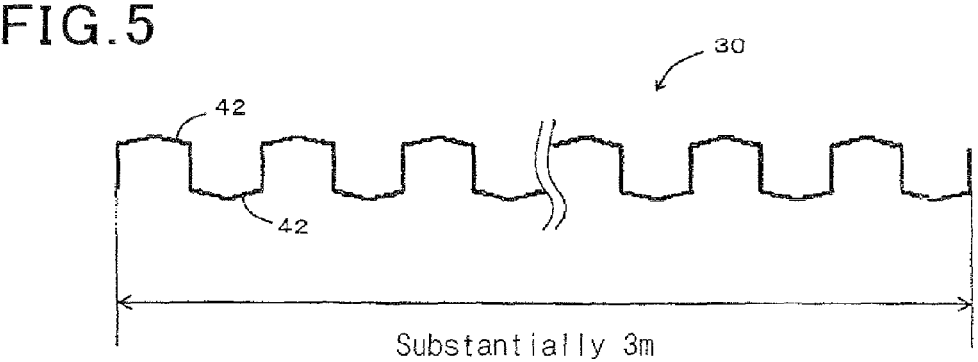
FIG. 5 is a front view showing the overall shape of a coil wire.
Figure 6:
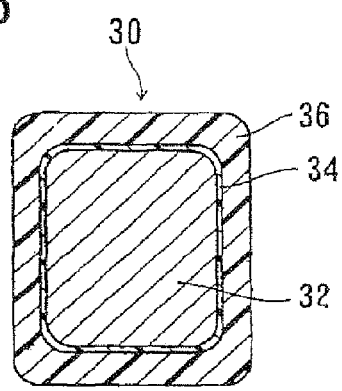
FIG. 6 is a cross-sectional view of the coil wire.
Figure 7:
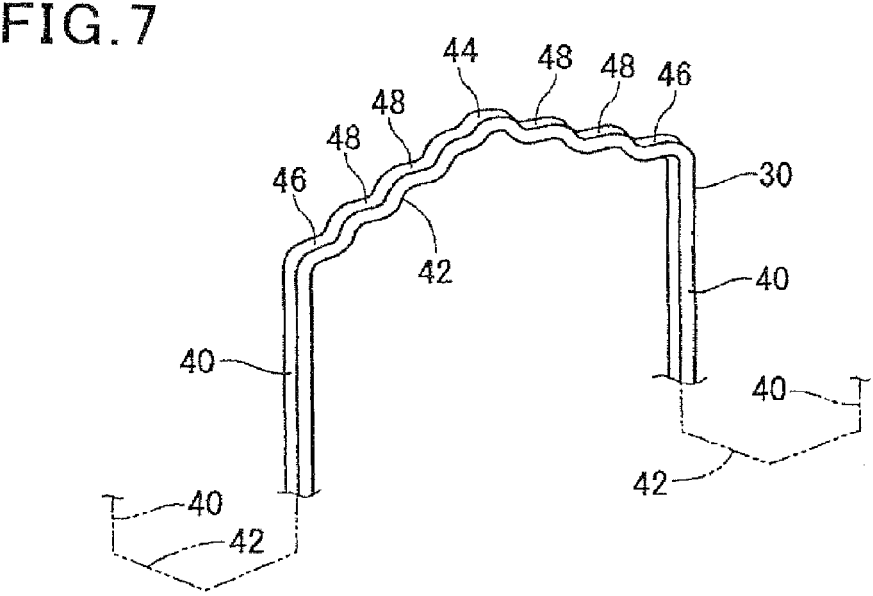
FIG. 7 is a perspective view showing the shape of a turn portion of the coil wire.

Next, the configuration of the coil assembly 20 will be described. FIG. 3 is a perspective view showing the external appearance of the coil assembly 20. FIG. 4 is a front view showing a coil end portion of the coil assembly 20. FIG. 5 is a front view showing the overall shape of one of coil wires 30 used to form the coil assembly 20. FIG. 6 is a cross-sectional view of one of the coil wires 30. FIG. 7 is a perspective view showing the shape of a turn portion 42 of one of the coil wires 30.

Each coil wire 30 of the coil assembly 20 has, as shown in FIG. 5, a plurality of turn portions 42 formed at predetermined pitches. The length of each coil wire 30 is substantially equal to 3 m. Moreover, as shown in FIG. 6, each coil wire 30 is comprised of a copper-made electric conductor 32 and an insulating coat that covers the surface of the conductor 32 to electrically insulate the conductor 32. The insulating coat is comprised of an inner layer 34 and an outer layer 36. The inner layer 34 covers the surface of the conductor 32, and the outer layer 36 covers the outer surface of the inner layer 34. The thickness of the insulating coat including the inner and outer layers 34 and 36 is set to be in the range of 100 μm to 200 μm. Consequently, with such a large thickness of the insulating coat, it is unnecessary to interpose insulating paper sheets between the coil wires 30 for the purpose of electrically insulating the coil wires 30 from one another.

The outer layer 36 is made of an insulating material such as nylon. The inner layer 34 is made of a thermoplastic resin having a higher glass transition temperature than the outer layer 36 or an insulating material having no glass transition temperature such as a polyamide-imide resin. Consequently, the outer layers 36 of the coil wires 30 will be softened by the heat generated in the electric rotating machine earlier than the inner layers 34, thereby bonding together those of the coil wires 30 which are received in the same ones of the slots 14 and 15. As a result, those of the coil wires 30 which are received in the same ones of the slots 14 and 15 are integrated into a rigid body, thereby enhancing the mechanical strength thereof. Moreover, when excessive vibration occurs, the outer layers 36 will be first separated from the inner layers 34, leaving the inner layers 34 to keep covering the conductors 32 and thereby securing the insulation between the coil wires 30.

Each coil wire 30 has, as shown in FIG. 2, a plurality of in-slot portions 40 received in the slots 14 and 15 of the stator core 12 and the plurality of turn portions 42 that protrude outside of the stator core 12 from the slots 14 and 15 and connect the in-slot portions 40 circumferentially arranged in different ones of the slots 14 and 15. The coil wires 30 are each wave-wound around the stator core 12, thereby forming the stator coil (i.e., the coil assembly) 20. The turn portions 42 are formed on both the axial sides of the stator core 12. For each coil wire 30, the odd-numbered turn portions 42 are alternately arranged with the even-numbered turn portions 42 around the axis of the stator core 12 with the phase differences therebetween equal to 180°.

At substantially the center of each of the turn portions 42, as shown in FIG. 7, there is formed a crank portion 44 without twist. The crank portion 44 is crank-shaped so as to extend parallel to an axial end face 13 of the stator core 12. The amount of shift in position obtained by the crank shape of the crank portion 44 is substantially equal to the width of the coil wires 30. Consequently, those of the turn portions 42 of the coil wires 30 which adjoin one another in the radial direction of the stator core 12 can be densely wound with respect to each other. As a result, the radial width of the coil ends can be reduced, thereby preventing the coil assembly 20 from protruding radially outward.

Moreover, in those protruding spots of the turn portions 42 where the turn portions 42 protrude outside of the stator core 12 from the slots 14 and 15, there are formed crank portions 46 that extend along the axial end faces 13 of the stator core 12. Consequently, the length of the base of a triangle formed by each of the turn portions 42 becomes smaller than the interval between those of the slots 14 and 15 astride which the coil wire 30 extends. As a result, the axial height h of the coil ends of the stator coil is reduced.

Furthermore, $d1 \leq d2$, where d1 is the length of the crank portions 46 extending along the axial end faces 13 of the stator core 12, and d2 is the interval between each circumferentially-adjacent pair of the slots 14 and 15 of the stator core 12. Consequently, it is possible to prevent the crank portions 46 of each of the coil wires 30 from interfering with other coil wires 30 which protrude from the slots 14 and 15 adjacent to the crank portions 46. Thus, it is possible to prevent interference between those of the coil wires 30 which respectively protrude from a circumferentially-adjacent pair of the slots 14 and 15. Consequently, it is possible to prevent both the axial height h and the radial width of the coil ends of the stator coil from increasing. As a result, the axial height h of the coil ends can be reduced. In addition, with the reduced radial width of the coil ends, it is possible to prevent the coil assembly 20 from protruding radially outward.

Further, in each of the turn portions 42 of the coil wires 30, there are formed two crank portions 48 between the crank portion 44 and each of the crank portions 46. That is to say, in each of the turn portions 42 of the coil wires 30, there are formed a total of seven crank portions. Consequently, the height h of the turn portions 42 is reduced in comparison with those of triangular turn portions that have no crank portions formed therein. Like the crank portions 44 and 46, the crank portions 48 are also crank-shaped so as to extend parallel to the axial end face 13 of the stator core 12. As a result, each of the turn portions 42 of the coil wires 30 is stepped on both sides of the crank portion 44.

In addition, for the coil assembly 20 which makes up the three-phase stator coil, with respect to each magnetic pole of the rotor, those of the coil wires 30 which together make up the same phase of the stator coil are received in a circumferentially-adjacent pair of the slots 14 and 15. That is to say, the number of the circumferentially-adjacent slots 14 and 15 per magnetic pole of the rotor is equal to 3×2=6. Therefore, each of the coil wires 30 is received in those of the slots 14 and 15 that are spaced 6 slots apart in the circumferential direction of the stator core 12. Accordingly, it is preferable for each of the turn portions 42 to include a total of (3×2+1) crank portions including the crank portion 44 formed at substantially the center thereof, so as to prevent interference between those coil wires 30 which protrude from the circumferentially-adjacent slots 14 and 15. As a result, it is possible to reduce both the axial height and radial width of the coil ends of the stator coil.

[First Embodiment]

Figure 8A:
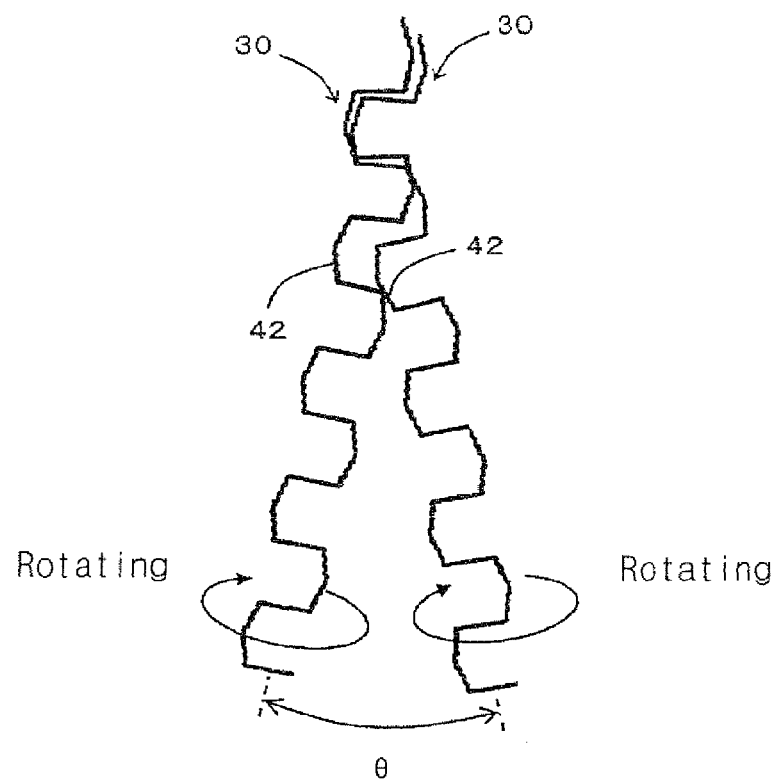
FIG. 8A is a schematic view illustrating a manufacturing method, according to a first embodiment of the present invention, of the coil assembly.
Figure 8B:
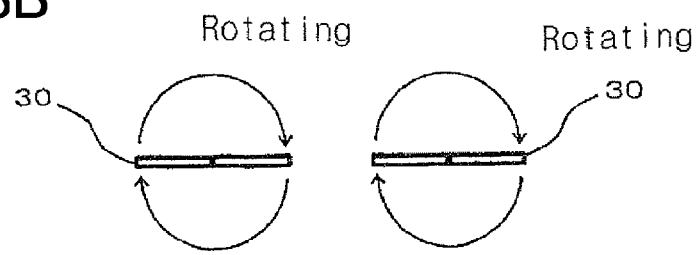
FIG. 8B is an axial view showing the positional relationship between a pair of coil wires being interlaced.

Next, a method of manufacturing the coil assembly 20 according to the first embodiment will be described. FIGS. 8A AND 8B are schematic views illustrating an interlacing method according to the first embodiment in manufacturing the coil assembly 20. In addition, it is assumed that the coil wires 30 having the turn portions 42 as shown in FIG. 5 have previously been formed by shaping straight wires using dies. Accordingly, only the interlacing method of the coil wires 30 will be described hereinbelow.

First, as shown in FIG. 8A, at one ends of a pair of the coil wires 30, a corresponding pair of the turn portions 42 of the coil wires 30 are crossed. Further, the other ends of the coil wires 30 are held such that the angle 9 between the axes of the coil wires 30 falls in a predetermined range (greater than or equal to 10° and less than or equal to)90°. Then, the coil wires 30 are rotated respectively about their axes in the same direction, so that corresponding pairs of the turn portions 42 of the coil wires 30 are sequentially crossed from the one ends to the other ends, thereby interlacing the coil wires 30. The interlacing of the pair of the coil wires 30 is completed by crossing all the corresponding pairs of the turn portions 42 of the coil wires 30. In addition, as shown in FIG. 8B, the pair of the coil wires 30 are respectively rotated at the same speed and with the same phase (i.e., with the difference in phase angle therebetween being equal to 0°). Further, for the pair of the coil wires 30 after being interlaced, one of the coil wires 30 crosses the other coil wire 30 from a first face side to a second face side of the other coil wire 30 at engaging positions between the corresponding pairs of the odd-numbered turn portions 42, and from the second face side to the first face side at engaging positions between the corresponding pairs of the even-numbered turn portions 42.

Further, a procedure for interlacing twelve coil wires 30 using the above-described method will be described with reference to FIG. 9. FIG. 9 is a schematic view illustrating the procedure for interlacing the twelve coil wires 30.

In FIG. 9, numerals 1-12 respectively indicate the numbers of the twelve coil wires 30. First, the interlacing of the coil wires 30 is performed using the above-described method for each of six pairs of the coil wires 30 which include the pair of No. 1 and No. 2, the pair of No. 3 and No. 4, the pair of No, 5 and No. 6, the pair of No. 7 and No. 8, the pair of No. 9 and No. 10, and the pair of No. 11 and No. 12. Then, the interlacing of the coil wires 30 is further performed using the above-described method for each of three pairs which include the pair of No. 1+No. 2 and No. 3+No. 4, the pair of No. 5+No. 6 and No. 7+No. 8, the pair of No. 9+No. 10 and No. 11+No. 12. In addition, the resultant No. 1+No. 2+No. 3+No. 4, No. 5+No. 6+No. 7+No. 8, and No. 9+No. 10+No. 11+No. 12 respectively make up the three phases of the stator coil. Next, No. 1+No. 2+No. 3+No. 4 is further interlaced with No. 5+No. 6+No. 7+No. 8. Then, No. 1+No. 2+No. 3+No. 4+No. 5+No. 6+No. 7+No. 8 is further interlaced with No. 9+No. 10+No. 11+No. 12, thereby finishing the interlacing of the twelve coil wires 30. Thereafter, the ends of the coil wires 30 are joined at a plurality of spots, and the twelve interlaced coil wires 30 are together bent into a doughnut shape, forming the coil assembly 20 as shown in FIG. 3.

As made clear from the above, in the present embodiment, since a pair of the coil wires 30 are rotated respectively about their axes, it is possible to interlace the pair of the coil wires 30 without causing interference between the turn portions 42 of the coil wires 30. Therefore, compared to methods according to a first modification shown in FIG. 10 and a second modification shown in FIG. 11, it is possible to reduce the angle θ between the axes of the coil wires 30, thereby suppressing deformation of the coil wires 30 occurring during the interlacing thereof; in the method according to the first modification, one of the coil wires 30 is made to revolve around the other; in the method according to the second modification, both the coil wires 30 are made to revolve around each other. In addition, the angles θ between the axes of the coil wires 30 in the first and second modifications are illustrated as being equal to 30° in FIGS. 10 and 11.

Moreover, compared to the methods according the first and second modifications, it is possible to use a smaller device to rotate each of the coil wires 30 about its axis. Consequently, it is possible to reduce both the size and cost of an apparatus for manufacturing the coil assembly 20. Furthermore, since the rotational movement of the coil wires 30 is limited to a smaller range, it is possible to rotate the coil wires 30 at a higher speed. Consequently, it is possible to easily realize a high-speed interlacing of the coil wires 30.

Furthermore, since the angle θ between the axes of the coil wires 30 is set to be greater than or equal to 10°, it is possible to interlace the coil wires 30 without causing interference between the turn portions 42 of the coil wires 30. Moreover, since the angle θ is set to be less than or equal to 90°, it is possible to suppress deformation of the coil wires 30.

Furthermore, since the coil wires 30 are rotated respectively about their axes at the same speed, it is possible to sequentially and smoothly cross the corresponding pairs of the turn portions 42 of the coil wires 30 from the one ends to the other ends of the coil wires 30.

Furthermore, since the coil wires 30 are rotated with the difference in phase angle therebetween being equal to 0°, it is possible to reliably and sequentially cross the corresponding pairs of the turn portions 42 of the coil wires 30 without causing interference between the turn portions 42.

In addition, the present invention is not limited to the above-described embodiment. It is needless to say that various changes may be made without departing from the spirit of the invention.

For example, in the previous embodiment, the coil wires 30 are rotated respectively about their axes at the same speed. However, it is unnecessary to rotate the coil wires 30 always at exactly the same speed, provided that the coil wires 30 can be rotated keeping synch with each other.

Figure 12A:
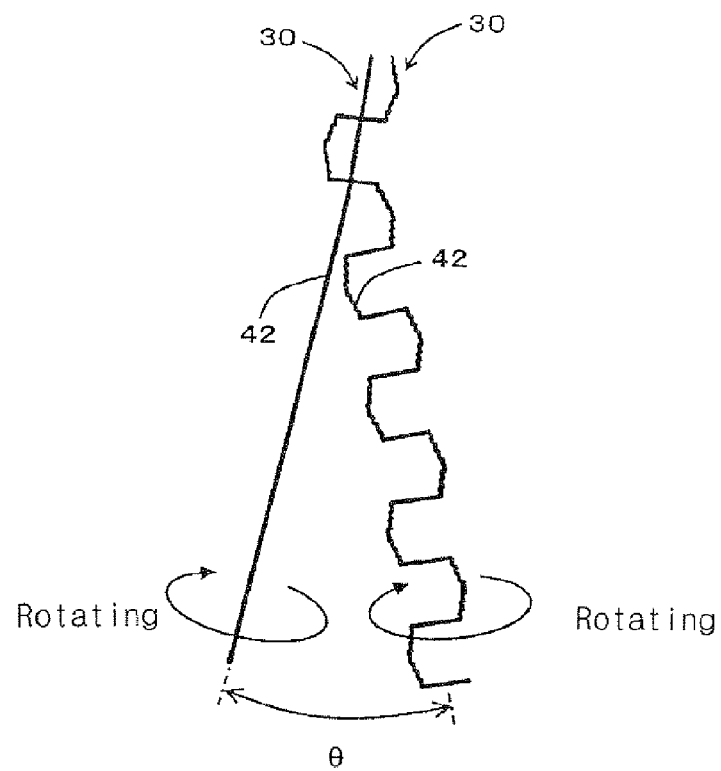
FIG. 12A is a schematic view illustrating a manufacturing method, according to a third modification, of the coil assembly.
Figure 12B:
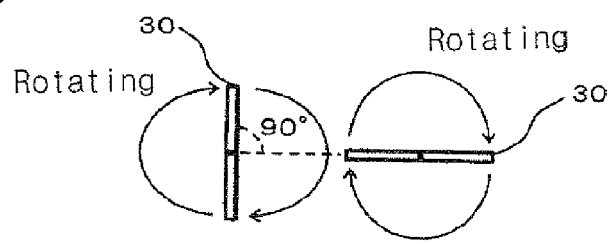
FIG. 12B is an axial view showing the positional relationship between a pair of coil wires being interlaced.

Moreover, in the previous embodiment, the coil wires 30 are rotated respectively about their axes with same phase (i.e., with the difference in phase angle therebetween being equal to) 0°. However, it is also possible to rotate the coil wires 30 with the difference in phase angle therebetween being greater than 0° and less than or equal to 90°. In this case, to the extent that no interference between the turn portions 42 of the coil wires 30 occurs, it is possible to reduce the angle θ between the axes of the coil wires 30 while allowing the corresponding pairs of the turn portions 42 to be reliably and sequentially crossed. FIG. 12A is a schematic view illustrating a method of manufacturing the coil assembly 20 according to a third modification; FIG. 12B is an axial view showing the positional relationship between a pair of the coil wires 30 being interlaced. As shown in FIG. 12B, in this modification, the coil wires 30 are rotated with the difference in phase angle therebetween being equal to 90°. According to the third modification, since the difference in rotational phase angle between the coil wires 30 is equal to 90°, it is possible to minimally set the angle θ between the axes of the coil wires 30, to the extent that no interference between the turn portions 42 of the coil wires 30 occurs.

Figure 13:
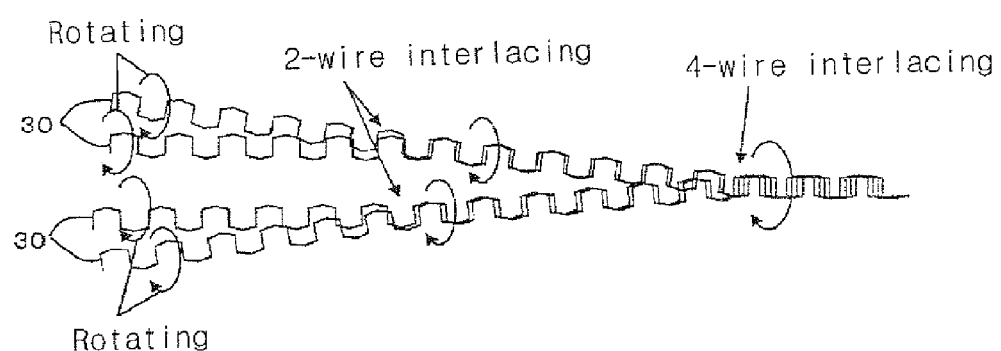
FIG. 13 is a schematic view illustrating a manufacturing method, according to a fourth modification, of the coil assembly, wherein four coil wires are continuously interlaced.

Furthermore, in the previous embodiment, two pairs of the coil wires 30 are first respectively interlaced, and then the two interlaced pairs are further interlaced, thereby making the four coil wires 30 interlaced with each other. However, as in a fourth modification shown in FIG. 13, it is also possible to continuously interlace four coil wires 30 by simultaneously interlacing two pairs of the coil wires 30. More specifically, in the fourth modification, there are provided two pairs of the coil wires 30. In those sections of the two pairs of the coil wires 30 which have been interlaced, one pair of the turn portions 42 of one of the two pairs of the coil wires 30 is made to cross that of the other pair of the coil wires 30; the other ends of the coil wires 30 of the two pairs are held such that the angle between the axis of the interlaced section of one of the two pairs of the coil wires 30 and the axis of the interlaced section of the other pair of the coil wires 30 falls in a predetermined range. Then, the coil wires 30 of the two pairs are rotated respectively about their axes in the same direction, so that the corresponding turn portions 42 of the coil wires 30 of the two pairs are sequentially crossed from the one ends to the other ends of the coil wires 30, thereby continuously interlacing the four coil wires 40. In addition, in the fourth modification, the other end (i.e., the left end in FIG. 13) of each of the coil wires 30 of the two pairs is rotated to cause the center and the right end (i.e., the right end in FIG. 13) to rotate along therewith. In this case, if necessary, it is possible to provide a guide member at either or both of the center and the one end to transmit torque from the other end to the one end.

Figure 14:
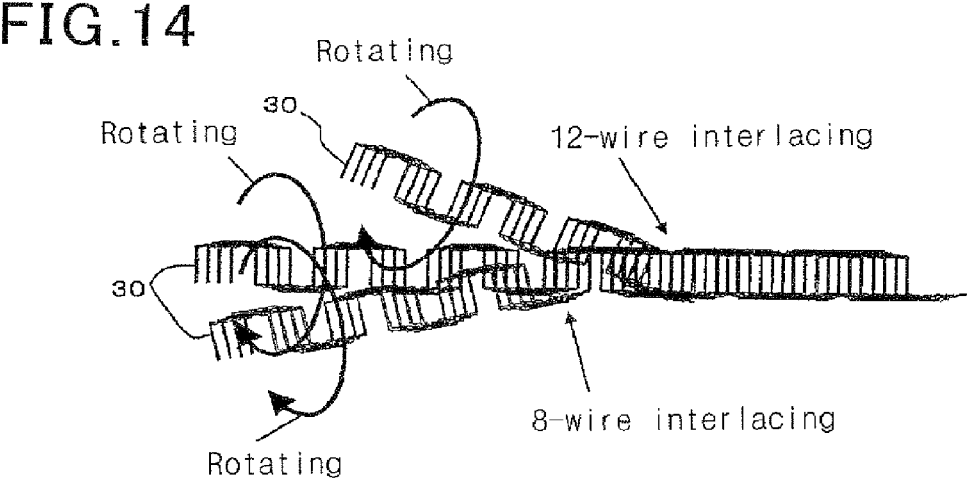
FIG. 14 is a schematic view illustrating a manufacturing method, according to a fifth modification, of the coil assembly, wherein twelve coil wires are continuously interlaced.

Moreover, as in a fifth modification shown in FIG. 14, twelve coil wires 30 can be continuously interlaced by: interlacing four interlaced coil wires 30 with another four interlaced coil wires 30, using the above-described method, to obtain eight interlaced coil wires 30; and further interlacing the eight interlaced coil wires 30 with still another four interlaced coil wires 30 using the same method.

In addition, in implementing the fourth and fifth modifications, it is possible to combine the interlacing methods according to the first embodiment or the third modification with those according to the first or second modifications.

[Second Embodiment]

Next, a method of manufacturing the coil assembly 20 according to a second embodiment will be described. FIGS. 15A to 17C are schematic views illustrating an interlacing method used in manufacturing the coil assembly 20 according to the second embodiment. First coil wires 30A and second coil wires 30B used in the second embodiment are identically shaped as the coil wires 30 used in the first embodiment. In addition, in FIGS. 15-17, the shape of the turn portions which are actually stepped is illustrated as a straight shape through simplification. Moreover, in FIGS. 15-17, the solid-line circles indicate those spots where the second coil wire 30B is positioned in front of the first coil wire 30; the dashed-line circles indicate those spots where the first coil wire 30A is positioned in front of the second coil wire 30B.

Figure 15A:
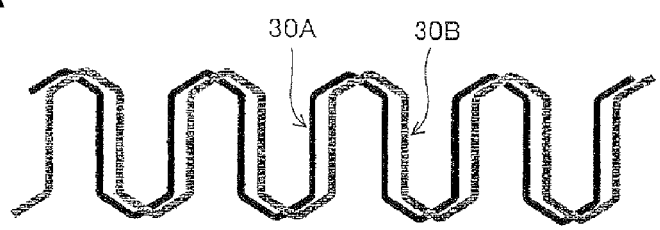

The method of interlacing the first and second coil wires 30A and 30B according to the present embodiment includes a placing step, a first rotating step, and a second rotating step, which are sequentially performed. First, in the placing step, as shown in FIG. 15A, a first coil wire 30A and a second coil wire 30B are placed so as to face each other with the same phase (i.e., with the difference in phase angle therebetween being equal to 0°). In addition, the second coil wire 30B is placed so as to be offset from the first coil wire 30A by a predetermined distance in an axial direction (i.e., the rightward direction in FIG. 15A). Here, the predetermined distance is a distance slightly longer than the distance between an adjacent pair of the slots 14 and 15 formed in the stator core 10.

Figure 15B:
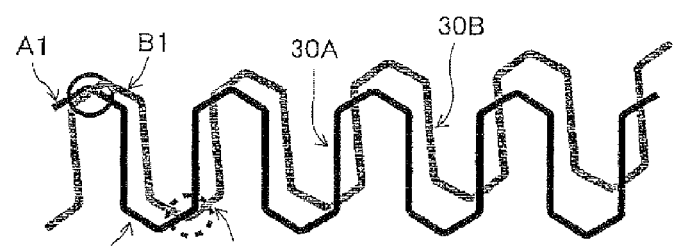
Figure 15C:
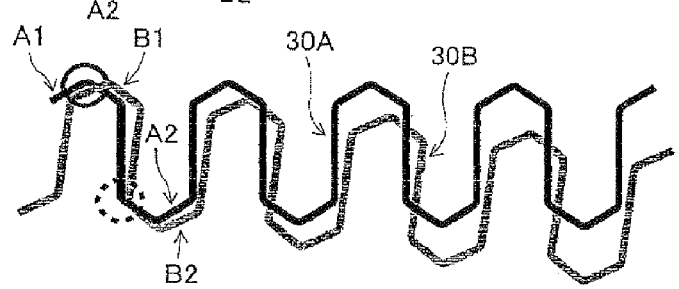

Next, in the first rotating step, as shown in FIGS. 15B AND 15C, with the first coil wire 30A being fixed, the second coil wire 30B is rotated (or revolved) keeping the same phase as the first coil wire 30A, so as to make, while keeping engagement between the first turn portion A1 (i.e., the first turn portion from the left side in FIGS. 15A to 17C) of the first coil wire 30A and the first turn portion B1 (i.e., the first turn portion from the left side in FIGS. 15A to 17C) of the second coil wire 30B, the second turn portion B2 and the subsequent turn portions of the second coil wire 3013 rotate around the first coil wire 30A. Consequently, the second turn portion 30A of the first coil wire 30A and the second turn portion 132 of the second coil wire 30B are engaged with each other.

Figure 16:
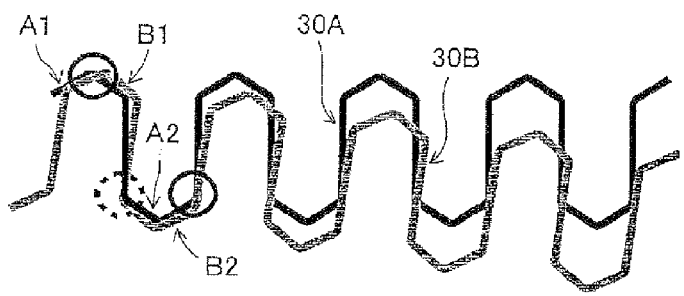
Figure 16B:
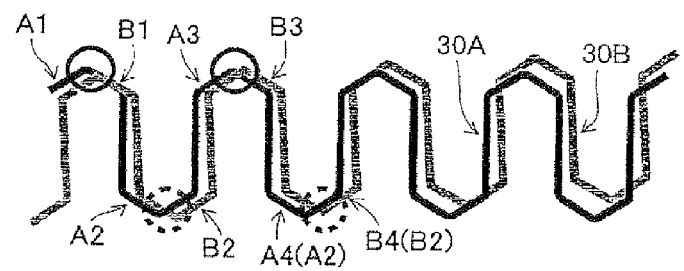
Figure 16C:
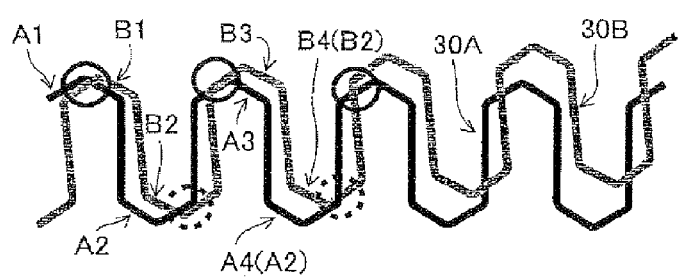

Further, in the second rotating step, as shown in FIGS. 16A and 16B, with the first coil wire 30A being fixed, the second coil wire 30B is rotated (revolved) keeping the same phase as the first coil wire 30A, so as to make, while keeping engagement between the second turn portion A2 of the first coil wire 30A and the second turn portion 132 of the second coil wire 30B, the third turn portion B3 and the subsequent turn portions of the second coil wire 30B rotate around the first coil wire 30A. Consequently, the third turn portion A3 of the first coil wire 30A and the third turn portions B3 of the second coil wire 30B are engaged with each other.

Thereafter, as shown in FIGS. 16C and 17A to 17C, the interlacing of the fourth turn portions A4 and B4 and subsequent turn portions of the first and second coil wires 30A and 30B is performed by repeating the above-described first and second rotating steps. In addition, the fourth turn portions A4 and B4 at the end of the second rotating step are regarded as the second turn portions A2 and B2 in the next-performed first rotating step. As a result, the corresponding pairs of the turn portions of the coil wires 30A and 30B are interlaced over the entire length of the first and second coil wires 30A and 30B.

Figure 17A:
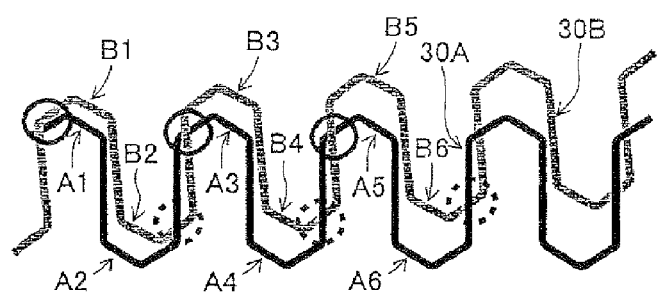
Figure 17B:
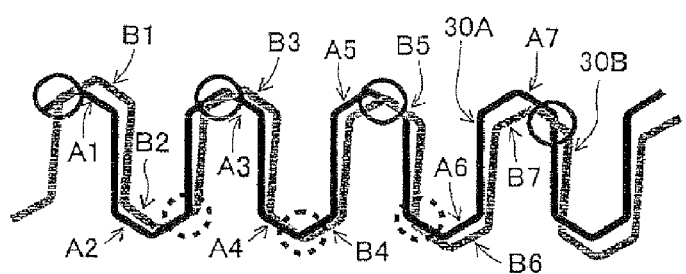
Figure 17C:
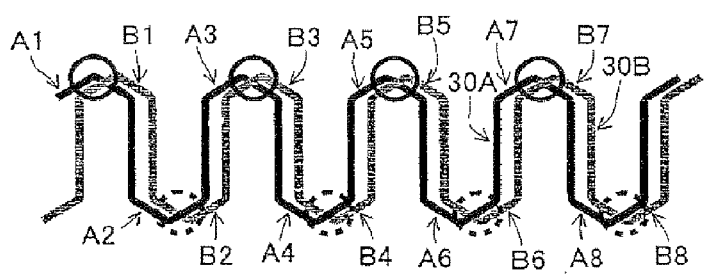

In addition, in those sections of the first and second coil wires 30A and 30B which have been interlaced, the first coil wire 30A crosses the second coil wire 30B from a first face side (i.e., the back face side) to a second face side (i.e., the front face side) of the second coil wire 30B at engaging positions (the solid line-circled spots in FIG. 17C) between the corresponding pairs of the odd-numbered turn portions, and from the second face side to the first face side at engaging positions (the dashed line-circled spots in FIG. 17(C)) between the corresponding pairs of the even-numbered turn portions.

As described above, with the method of manufacturing the coil assembly 20 according to the second embodiment, which includes the placing step, the first rotating step, and the second rotating step, it is possible to easily and reliably interlace the first and second coil wires 30A and 30B each having the plurality of turn portions formed therein. Moreover, it is unnecessary to perform a step of deforming the first and second coil wires 30A and 30B after interlacing them; it is therefore possible to prevent an increase in man-hour and occurrence of damage to the insulating coats covering the surfaces of the first and second coil wires 30A and 3013.

Moreover, in the first and second rotating steps, only the second coil wire 30B is rotated around the first coil wire 30A, with the first coil wire 30A being fixed. Therefore, it is possible to easily control the rotational movement of the second coil wire 30B. Consequently, it is possible to more reliably and steadily interlace the first and second coil wires 30A and 30B. Moreover, it is also possible to simplify the structure of an interlacing apparatus for interlacing the first and second coil wires 30A and 30B, thereby reducing the manufacturing cost.

In addition, in the first and second rotating steps, it is also possible to rotate both the first and second coil wires 30A and 30B.

Furthermore, as a procedure for interlacing twelve coil wires 30A and 30B using the above-described method according to the second embodiment, it is possible to directly employ the interlacing procedure described in the first embodiment with reference to FIG. 9. More specifically, in this case, the placing step is first performed to place six pairs of the first and second coil wires 30A and 30B. Then, the twelve coil wires 30A and 30B are interlaced by repeating third and fourth rotating steps. In the third rotating step, in those sections of the pairs of the first and second coil wires 30A and 30B which have been interlaced, at least one of pairs C and D is rotated keeping engagement between the first turn portions C1 of the pair C and the first turn portions D1 of the pair D, thereby engaging the second turn portions C2 of the pair C with the second turn portions D2 of the pair D. In the fourth rotating step, at least one of the pairs C and D is rotated keeping engagement between the second turn portions C2 of the pair C and the second turn portions D2 of the pair D, thereby engaging the third turn portions C3 of the pair C with the third turn portions D3 of the pair D.

[Third Embodiment]

Next, a method of manufacturing the coil assembly 20 according to a third embodiment will be described. FIGS. 18A to 25 are schematic views illustrating an interlacing method used in manufacturing the coil assembly 20 according to the third embodiment. First coil wires 30A and second coil wires 30B used in the third embodiment are identical to those used in the second embodiment. In addition, in FIGS. 18A to 19C, the shape of the turn portions which are actually stepped is illustrated as a straight shape through simplification. Moreover, in FIGS. 18 and 19, those views of <Motion of interlaced section> and <Motion of non-interlaced section> which are respectively on the left and right sides for each step show the first and second coil wires 30A and 30B viewed in the axial direction from the left side.

Figure 18A:
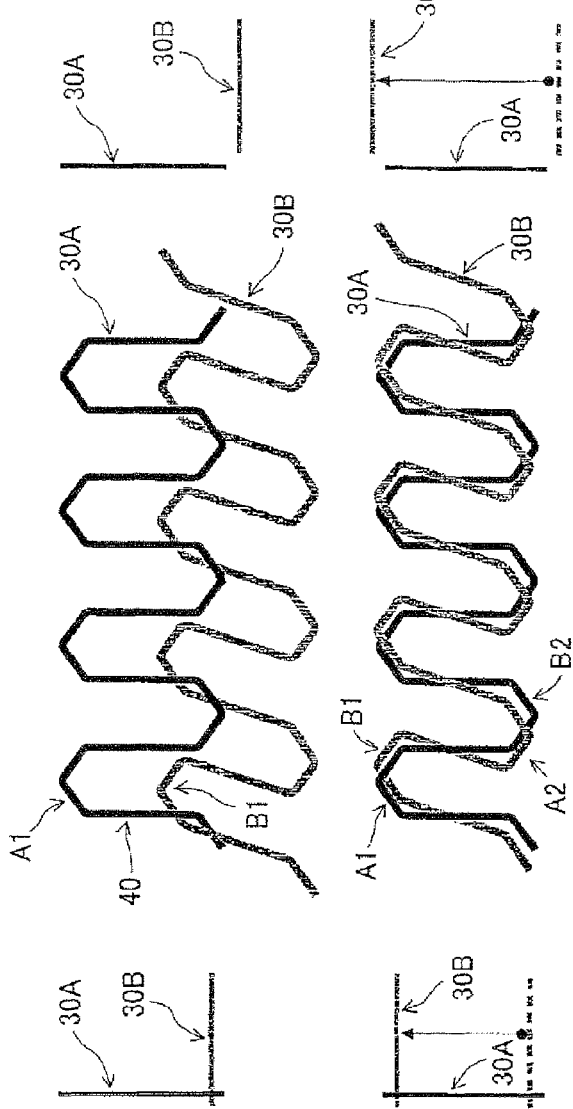
Figure 20:
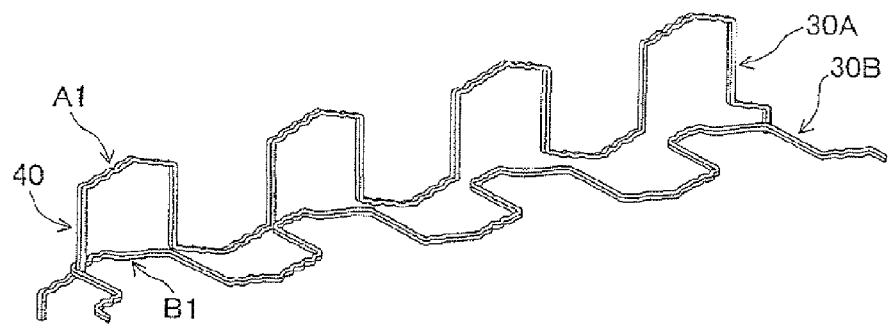
FIG. 20 is a perspective view corresponding to FIG. 18A in the third embodiment.

The method of interlacing the first and second coil wires 30A and 30B according to the present embodiment includes a placing step, a first rotating step, and a second rotating step, which are sequentially performed. First, in the placing step, as shown in FIGS. 18A and 20, a first coil wire 30A and a second coil wire 30B are so placed that the difference in phase angle therebetween is equal to 90°. In addition, the first coil wire 30A is placed so that the turn portions formed on opposite sides of the axis are respectively located on opposite sides in the vertical direction; the second coil wire 30B is placed so that the turn portions formed on opposite sides of the axis are respectively located on opposite sides in a horizontal direction.

The second coil wire 30B is placed so as to be offset from the first coil wire 30A by a predetermined distance in an axial direction (i.e., the leftward direction in FIG. 18A). Here, the predetermined distance is equal to that in the second embodiment. Moreover, in the second coil wire 30B, only the first turn portion B1 is located within the range of the length of the in-slot portions 40 of the first coil wire 30A that extend straight in the vertical direction (see the view of <Motion of interlaced section> in FIG. 18A). The second turn portion A2 and the subsequent turn portions of the first coil wire 30A are located outside the range of the length of the in-slot portions 40 of the second coil wire 3013 (see the view of <Motion of non-interlaced section> in FIG. 18(A)).

Figure 18B:
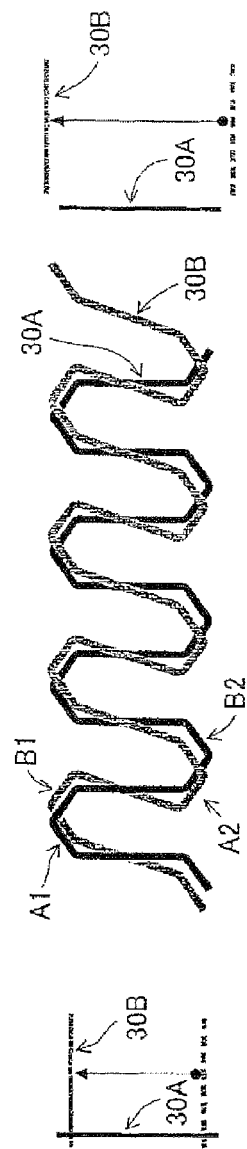
Figure 18C:
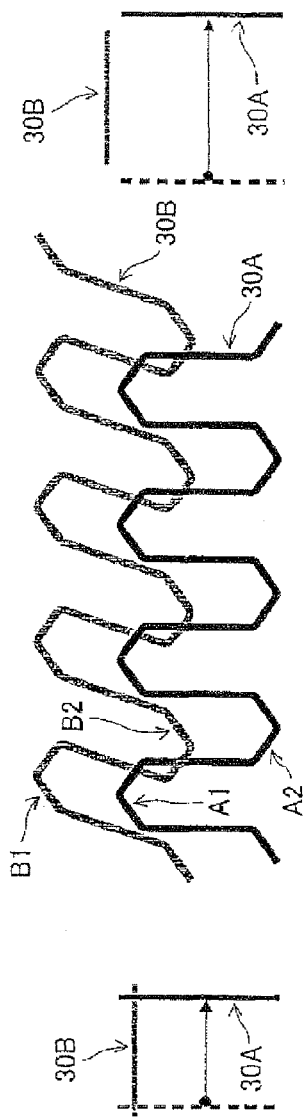
Figure 21:
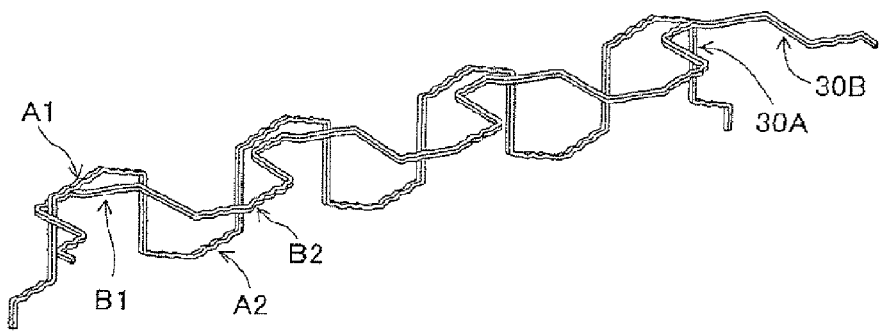
FIG. 21 is a perspective view corresponding to FIG. 18B in the third embodiment.
Figure 22:
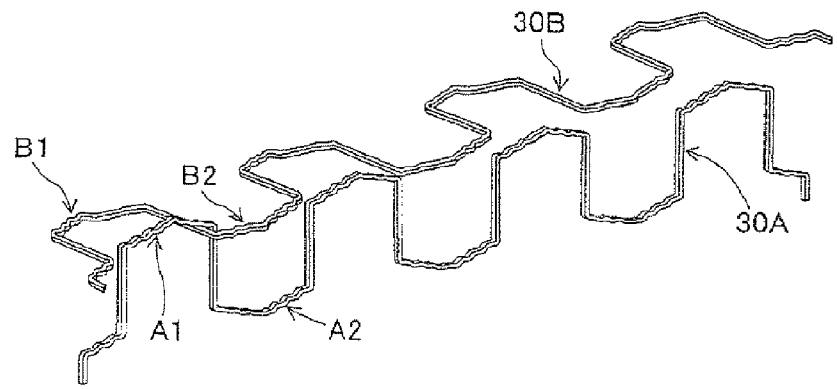
FIG. 22 is a perspective view corresponding to FIG. 18C in the third embodiment.

Next, in the first rotating step, as shown in FIGS. 18B and 21, the second coil wire 30B is first translated upward with the first coil wire 30A being fixed. Then, as shown in FIGS. 18C and 22, the first coil wire 30A is translated toward the rear side of the paper surface of FIG. 18C with the second coil wire 30B being fixed. Consequently, while keeping engagement between the first turn portion A1 of the first coil wire 30A and the first turn portion B1 of the second coil wire 30B, the second turn portion B2 and the subsequent turn portions of the second coil wire 30B are rotated around the first coil wire 30A by a half turn with the difference in phase angle being kept at 90°. As a result, the second turn portion A2 of the first coil wire 30A and the second turn portion B2 of the second coil wire 30B are brought into engagement with each other.

Figures 19A, 19B, 19C:
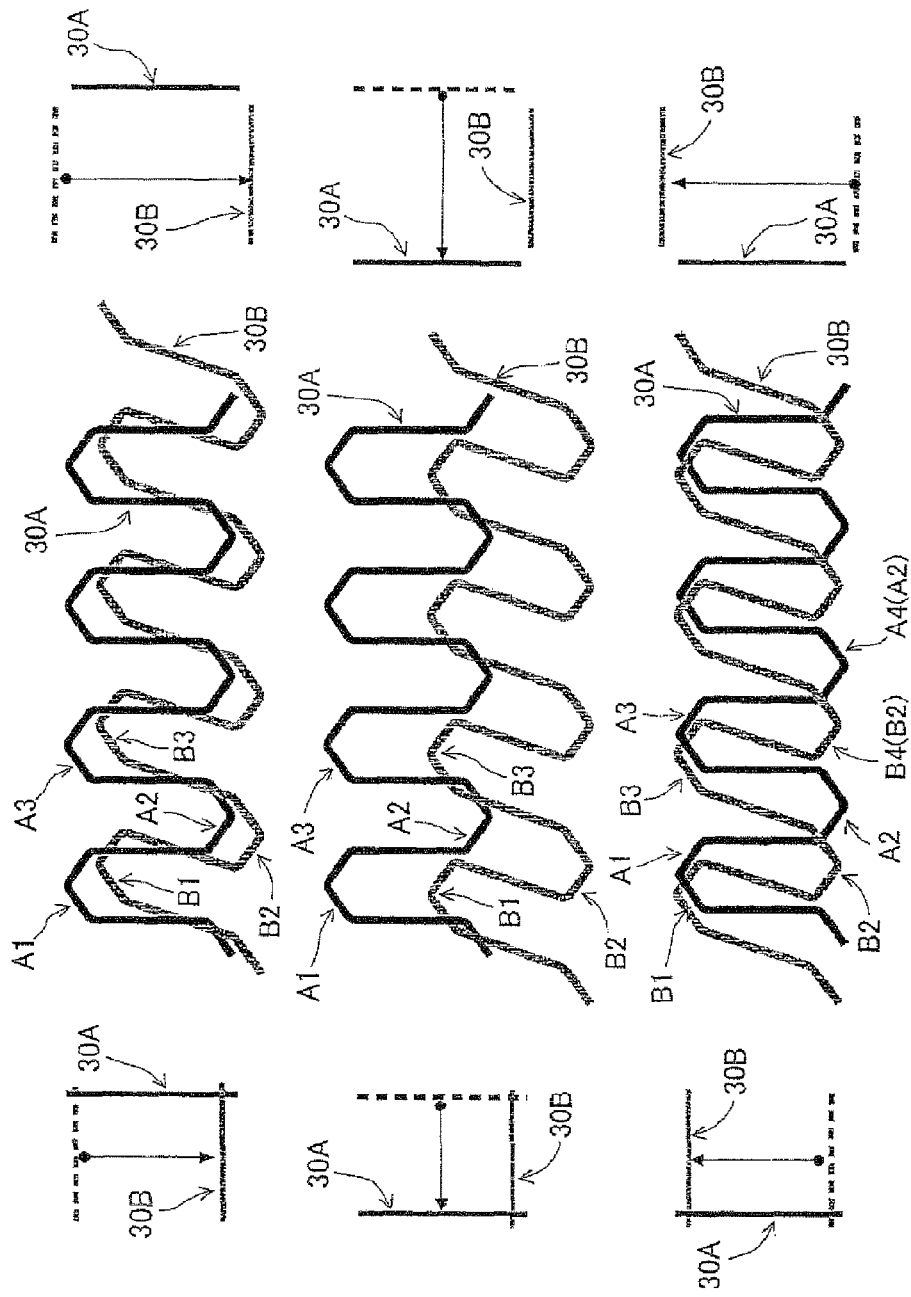
Figure 23:
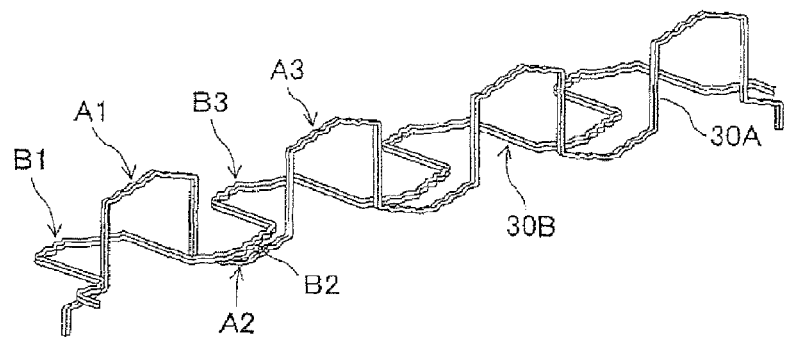
FIG. 23 is a perspective view corresponding to FIG. 19A in the third embodiment.
Figure 24:
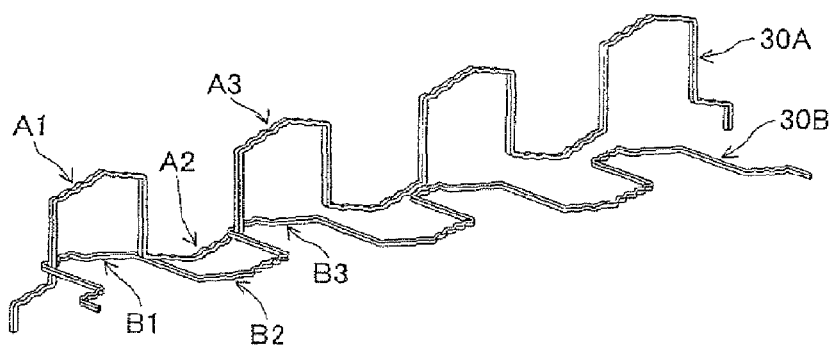
FIG. 24 is a perspective view corresponding to FIG. 19B in the third embodiment.

Further, in the second rotating step, as shown in FIGS. 19A and 23, the second coil wire 30B is first translated downward with the first coil wire 30A being fixed. Then, as shown in FIGS. 19B and 24, the first coil wire 30A is translated toward the front side of the paper surface of FIG. 18C with the second coil wire 30B being fixed. Consequently, while keeping engagement between the second turn portion A2 of the first coil wire 30A and the second turn portion B2 of the second coil wire 30B, the third turn portion B3 and the subsequent turn portions of the second coil wire 30B are rotated around the first coil wire 30A by a half turn with the difference in phase angle being kept at 90°. As a result, the third turn portion A3 of the first coil wire 30A and the third turn portion B3 of the second coil wire 30B are brought into engagement with each other. In addition, up to this point, the first coil wire 30A and the second coil wire 30B have been relatively rotated by one turn, and the corresponding pairs of the turn portions of the first and second coil wires 30A and 30B up to the pair of the third turn portions A3 and B3 have been engaged.

Figure 25:
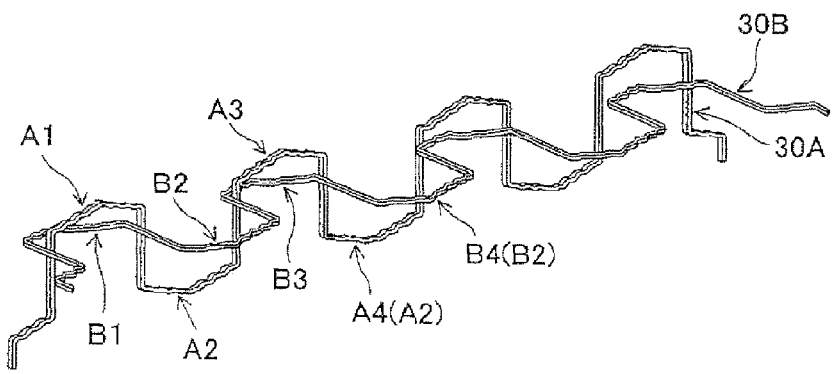
FIG. 25 is a perspective view corresponding to FIG. 19C in the third embodiment.

Thereafter, as shown in FIGS. 19C and 25, the second coil wire 30B is translated upward with the first coil wire 30A being fixed, thereby performing the same operation as shown in FIGS. 18B and 21. In this way, the first and second rotating steps are repeated. In addition, the fourth turn portions A4 and B4 at the end of the second rotating step (FIGS. 19B and 24) are regarded as the second turn portions A2 and B2 in the next-performed first rotating step. As a result, the corresponding pairs of the turn portions of the coil wires 30A and 30B are interlaced over the entire length of the first and second coil wires 30A and 30B.

Moreover, in the present embodiment, after interlacing the corresponding turn portions over the entire length, the first and second coil wires 30A and 30B are further relatively rotated by 90°, thereby being made to overlap each other. Consequently, as in the first and second embodiments, in those sections of the first and second coil wires 30A and 30B which have been interlaced, the first coil wire 30A crosses the second coil wire 30B from a first face side (i.e., the back face side) to a second face side (i.e., the front face side) of the second coil wire 30B at engaging positions between the corresponding pairs of the odd-numbered turn portions, and from the second face side to the first face side at engaging portions between the corresponding pairs of the even-numbered turn portions.

As described above, with the method of manufacturing the coil assembly 20 according to the third embodiment, which includes the placing step, the first rotating step, and the second rotating step, it is possible to achieve the same advantages as with the method according the second embodiment. For example, it is possible to easily and reliably interlace the first and second coil wires 30A and 30B each having the plurality of turn portions formed therein.

Moreover, in the third embodiment, the first and second coil wires 30A and 30B are so placed that the difference in phase angle therebetween is equal to 90°; the first and second rotating steps are performed with the difference in phase angle being kept at 90°. Consequently, it is possible to minimize the angle between the axes of the first and second coil wires 30A and 30B. Furthermore, in the first and second rotating steps, since the first coil wire 30A and the second coil wire 30B are alternately moved, it is possible to suppress deformation of the first and second coil wires 30A and 30B occurring during the interlacing thereof; it is also possible to speed up the interlacing of the first and second coil wires 30A and 30B.

In addition, as a procedure for interlacing twelve coil wires 30A and 30B using the above-described method according to the third embodiment, it is possible to directly employ the interlacing procedure described in the first embodiment with reference to FIG. 9.

INDUSTRIAL APPLICABILITY

The present invention is applicable to cases where it is needed to easily and reliably interlace coil wires in manufacturing a coil assembly for an electric rotating machine.

The invention claimed is:

1. A method of manufacturing a coil assembly for an electric rotating machine by interlacing a plurality of coil wires each having a plurality of turn portions formed therein, characterized by comprising:
   a placing step for placing a pair of first and second coil wires at predetermined positions with respect to each other;
   a first rotating step for rotating, while keeping engagement between a first turn portion of the first coil wire and a first turn portion of the second coil wire, at least one of the first and second coil wires to engage a second turn portion of the first coil wire with a second turn portion of the second coil wire; and
   a second rotating step for rotating, while keeping engagement between the second turn portion of the first coil wire and the second turn portion of the second coil wire, at least one of the first and second coil wires to engage a third turn portion of the first coil wire with a third turn portion of the second coil wire.

2. The method of manufacturing the coil assembly for the electric rotating machine as set forth in claim 1, further characterized by rotating the pair of the coil wires respectively about their axes in the same direction, with one pair of the first turn portions crossed at one ends of the coil wires and with the other ends of the coil wires being held such that an angle between the axes of the coil wires falls within a predetermined range, thereby sequentially crossing pairs of the second turn portions and the third turn portions of the coil wires.

3. The method of manufacturing the coil assembly for the electric rotating machine as set forth in claim 1, further characterized in that the angle between the axes of the coil wires is set to be greater than or equal to 10° and less than or equal to 90°.

4. The method of manufacturing the coil assembly for the electric rotating machine as set forth in claim 1, further characterized by rotating the coil wires respectively about their axes keeping synchronization therebetween.

5. The method of manufacturing the coil assembly for the electric rotating machine as set forth in claim 1, further characterized by rotating the coil wires with the same phase.

6. The method of manufacturing the coil assembly for the electric rotating machine as set forth in claim 1, further characterized by rotating the coil wires with the difference in phase angle therebetween being greater than 0° and less than or equal to 90°.

7. The method of manufacturing the coil assembly for the electric rotating machine as set forth in claim 6, further characterized by rotating the coil wires with the difference in phase angle therebetween being equal to 90°.

8. The method of manufacturing the coil assembly for the electric rotating machine as set forth in claim 1, further characterized in that: in interlaced sections of the pair of the coil wires, one of the coil wires crosses the other coil wire from a first face side to a second face side of the other coil wire at engaging positions between pairs of the odd-numbered turn portions, and from the second face side to the first face side at engaging positions between pairs of the even-numbered turn portions.

9. The method of manufacturing the coil assembly for the electric rotating machine as set forth in claim 1, further characterized in that:
   there are provided a plurality of pairs of the coil wires;
   in interlaced sections of the pairs of the coil wires, one pair of the first turn portions of each of the pairs of the coil wires is made to cross that of another of the pairs; and
   with the other ends of the coil wires of the pairs being held such that angles between the axes of the interlaced sections of the pairs of the coil wires fall in a predetermined range, the coil wires of the pairs are rotated respectively about their axes in the same direction, thereby sequentially crossing corresponding the second turn portions and the third turn portions of the coil wires of the pairs.

10. The method of manufacturing the coil assembly for the electric rotating machine as set forth in claim 1, further characterized in that:
   in the first rotating step, the first and second coil wires are relatively rotated so as to make the second turn portion of the second coil wire to rotate around the first coil wire; and
   in the second rotating step, the first and second coil wires are relatively rotated so as to make the third turn portion of the second coil wire to rotate around the first coil wire.

11. The method of manufacturing the coil assembly for the electric rotating machine as set forth in claim 1, further characterized in that:
   in the placing step, the first coil wire and the second coil wire are placed to face each other with the same phase; and
   in the first and second rotating steps, the first and second coil wires are rotated keeping the same phase.

12. The method of manufacturing the coil assembly for the electric rotating machine as set forth in claim 1, further characterized in that:
- in the placing step, the first coil wire and the second coil wire are so placed that the difference in phase angle therebetween is equal to 90°; and
- in the first and second rotating steps, the first and second coil wires are rotated keeping the difference in phase angle at 90°.

13. The method of manufacturing the coil assembly for the electric rotating machine as set forth in claim 1, further characterized in that:
- in the first and second rotating steps, only the second coil wire is rotated around the first coil wire with the first coil wiring being fixed.

14. The method of manufacturing the coil assembly for the electric rotating machine as set forth in claim 1, further characterized in that:
- in the first and second rotating steps, the first and second coil wires are alternately moved.

15. The method of manufacturing the coil assembly for the electric rotating machine as set forth in claim 1, further characterized in that:
- after completion of the second rotating step, the first and second rotating steps are identically repeated to interlace corresponding pairs of the fourth and subsequent turn portions of the coil wires.

16. The method of manufacturing the coil assembly for the electric rotating machine as set forth in claim 1, further characterized by comprising:
- the placing step in which a plurality pairs of the first and second coil wires are placed;
- a third rotating step in which keeping engagement between the first turn portions of one of the pairs of the first and second coil wires and those of another of the pairs in interlaced sections of the pairs of the first and second coil wires, at least one of the one pair and the another pair of the first and second coil wires is rotated to engage the second turn portions of the one pair with the second turn portions of the another pair; and
- a fourth rotating step in which keeping engagement between the second turn portions of the one pair and the another pair of the first and second coil wires, at least one of the one pair and the another pair of the first and second coil wires is rotated to engage the third turn portions of the one pair with the third turn portions of the another pair.

17. The method of manufacturing the coil assembly for the electric rotating machine as set forth in claim 1, further characterized in that: each of the coil wires includes a plurality of in-slot portions to be received in slots of a stator core and the plurality of turn portions which are to be located outside of the slots to connect the in-slot portions received in circumferentially different ones of the slots.

18. The method of manufacturing the coil assembly for the electric rotating machine as set forth in claim 1, further characterized in that: in each of the coil wires, the odd-numbered turn portions are alternately formed with the even-numbered turn portions at positions around the axis of the coil wire which are offset in phase from one another by 180°.

19. The method of manufacturing the coil assembly for the electric rotating machine as set forth in claim 1, further characterized in that: each of the turn portions of the coil wires is stepped with a plurality of crank portions.

* * * * *